US005787023A

United States Patent [19]

Kosugi

[11] Patent Number: 5,787,023
[45] Date of Patent: Jul. 28, 1998

[54] DIGITAL FILTER DEVICE FOR ELECTRONIC MUSICAL INSTRUMENTS

[75] Inventor: Taichi Kosugi, Shizuoka-ken, Japan

[73] Assignee: Kabushiki Kaisha Kawai Gakki Seisakusho, Shizuoka-Ken, Japan

[21] Appl. No.: 722,972

[22] Filed: Sep. 30, 1996

[30] Foreign Application Priority Data

Nov. 30, 1995 [JP] Japan .................................... 7-334282

[51] Int. Cl.[6] .............................. G06F 17/10; G10H 5/00

[52] U.S. Cl. .............................. 364/724.011; 364/724.19; 84/661

[58] Field of Search ...................... 364/724.011, 724.17, 364/724.19, 724.2; 84/59, 61

[56] References Cited

U.S. PATENT DOCUMENTS

| | | | |
|---|---|---|---|
| 4,907,484 | 3/1990 | Suzuki et al. | 84/661 |
| 5,140,541 | 8/1992 | Sakata et al. | 364/724.19 |
| 5,270,481 | 12/1993 | Matsunaga et al. | 84/661 |

*Primary Examiner*—Chuong Dinh Ngo
*Attorney, Agent, or Firm*—Andrus, Sceales, Starke & Sawall

[57] ABSTRACT

A digital filter device, for an electronic musical instrument, comprises: filter coefficient generation means for generating a set of filter coefficients in consonance with a designated resonance frequency and Q; and filter operation means for performing an operation for an IIR digital filter, relative to an input tone wave, by using the filter coefficient, which is generated by the filter coefficient generation means, with the filter coefficient generation means including trigonometric function output means, for outputting a trigonometric function value that is consonant with the resonance frequency, and filter coefficient calculation means, for calculating a plurality of filter coefficients based on the Q and the trigonometric function value that is generated by the trigonometric function output means, and with the filter coefficient calculation means having segment approximation means for performing, within a range of $x \geqq 0$, segment approximation of a function $f(x)=x/(1+x)$, or $f(x)=1/(1+x)$, and for outputting the filter coefficients.

9 Claims, 5 Drawing Sheets

DIGITAL FILTER DEVICE FOR ELECTRONIC MUSICAL INSTRUMENTS

BACKGROUND OF THE INVENTION

1. Field of the Invention

The present invention relates to an electronic musical instrument that includes a digital filter device, and specifically, to a digital filter for an electronic musical instrument that can enlarge an application range of a Q (quality factor) value, for a digital filter, by performing segment approximation to acquire a filter coefficient.

2. Related Arts

Recently, many digital filter devices are being employed for electronic musical instruments to generate musical tones having a variety of timbres. In a digital filter device, a specified filter coefficient is provided for a digital filter to determine a filter characteristic and to control a timbre.

In order to express a variety of timbres, some of these digital filter devices store multiple filter coefficients in a memory, and, as needed, read a desired filter coefficient therefrom and transmit it to a digital filter. This system, however, requires an extremely large memory capacity.

A method for acquiring filter coefficients by using calculations is employed to resolve the above problem. According to one method that uses conventional calculation, however, a filter coefficient is provided by calculating a primary approximate expression for a part for which division is required. But this method yields large calculation errors, and the applicable range of the quality factor for the filter is limited to $Q \geqq 1$.

There is another method whereby an accurate calculation circuit is employed to improve the accuracy of calculation. With this method, however, a large apparatus is required, and the cost of a device is increased.

An outline of the method that is used for determining a filter coefficient, which is employed for a conventional digital filter device, will now be explained.

A digital filter to be employed here is a second order IIR (infinite impulse response) LPF (low-pass filter). As is disclosed in Japanese Unexamined Patent Publication No. Hei 5-35277, a transfer function of this filter is acquired by bilinear transformation of the transfer function of an analog (continuous-time) second order LPF, and is represented by the following expression:

$$H(z) = \frac{a(1 + 2z^{-1} + z^{-1})}{1 + b + 2(A - 1)z^{-1} + (1 - b)z^{-2}} \quad (1)$$

It should be noted that $$A=1-\cos \omega_0;$$

$$a=A/(2*Q)\ (Q \geqq 1);$$

$$a=A/2(Q<1);$$

and $$b=\sin \omega_0/(2*Q).$$

At this time, the value of coefficient a is so determined that the maximum value of an amplitude-frequency property is nearly 1.

$\omega_0$ denotes a resonance frequency to which a sampling frequency is normalized, and is applied within a range of:

$$0<\omega_0<\pi.$$

This is called a cutoff frequency, for convenience sake. Q is also called resonance, for convenience sake.

The filter coefficient that is obtained by the bilinear transformation has a complicated shape, and can not be calculated by simple hardware. When a filter coefficient employed by a conventional digital filter device is to be calculated, an approximation of $$1/(1+b)=1-b$$

is employed with the assumption that $Q \geqq 1$. In other words, when $1/(1+b)=1-f(b)$, $$f(b)=b/(1+b) \quad (2),$$

and the approximation process is performed on this expression to acquire $$f(b)=b(0 \leqq b<1/2).$$

However, this approximation result can be applied only within a range of $Q \geqq 1$, and with $Q=1$ and $\omega_0=\pi/2$, an error due to the approximation is quite large. This method, therefore, provides unnatural results.

SUMMARY OF THE INVENTION

To resolve the shortcomings of conventional digital filter devices, it is one object of the present invention to provide a digital filter device, for an electronic musical instrument, that has a filter coefficient generator, with a comparatively simple circuit structure, that generates a filter coefficient with which a timbre in a practical, required range can be approximated with a high degree of accuracy.

To achieve the above object, according to the present invention, a digital filter device, for an electronic musical instrument, comprises: filter coefficient generation means for generating a set of filter coefficients in consonance with a designated resonance frequency and Q; and filter operation means for performing an operation for an IIR digital filter, relative to an input tone wave, by using the filter coefficient, which is generated by the filter coefficient generation means, with the filter coefficient generation means including trigonometric function output means, for outputting a trigonometric function value that is consonant with the resonance frequency, and filter coefficient calculation means, for calculating a plurality of filter coefficients based on the Q and the trigonometric function value that is generated by the trigonometric function output means, and with the filter coefficient calculation means having segment approximation means for performing, within a range of $x \geqq 0$, segment approximation of a function $f(x)=x/(1+x)$, or $f(x)=1/(1+x)$, and for outputting the filter coefficients.

An upper limit value for the segment approximation, which is performed by the segment approximation means, is so set as a value in the range of $x \geqq 0$ that the upper limit value can be easily identified by using a binary number.

The upper limit value of a range for the segment approximation, which is performed by the segment approximation means, is four.

A division point of the range for the segment approximation, which is performed by the segment approximation means, is so set that the division point can be easily identified by using a binary number.

An approximation expression that is set for the segment approximation, which is performed by the segment approximation means, is so set that a variable and a constant term of the approximation expression can be easily calculated by using a binary number.

The filter coefficient generation means has Q transformation means, for transforming a form that represents the Q, and output of the Q transformation means is used by the filter coefficient calculation means.

According to the present invention, before the approximation is performed on expression (2), an approximation expression is so set that the approximation expression can be easily calculated by binary processing, and the division of a range for value b is so set that the division can be easily identified by using a binary number.

In other words, for expression (2), value b is divided within a range of $0 \leqq b<4$ to set the approximation expressions that follow:

$$
\begin{aligned}
f(b) &\approx b && (0 \leqq b < 1/4)\\
f(b) &\approx b/2 + 2/16 && (1/4 \leqq b < 1/2)\\
f(b) &\approx b/4 + 4/16 && (1/2 \leqq b < 3/2)\\
f(b) &\approx b/8 + 7/16 && (3/2 \leqq b < 2)\\
f(b) &\approx b/16 + 9/16 && (2 \leqq b < 4).
\end{aligned}
$$

Since a filter coefficient can be calculated by using a simple operation, such as by checking the upper bit or by bit shifting, a function value for which segment approximation is performed can be provided by a simple circuit structure that yields only a small approximation error.

The application range for Q can be $Q>1/8$, and musical tones having various timbres can be satisfactorily produced.

According to the present invention, the simple circuit structure can calculate filter coefficient f while yielding only with a small approximation error. Although conventionally the approximate filter coefficient can only be provided in a range of $Q \geqq 1$, the application range of value Q of the present invention can be extended to $Q>1/8$.

According to the present invention, therefore, an electronic musical instrument that expresses various timbres can be provided at a low price.

DETAILED DESCRIPTION OF THE PREFERRED EMBODIMENT

The present invention relates to a digital filter device for an electronic musical instrument.

The preferred embodiment of the present invention will be described while referring to the accompanying drawings, but the present invention is not limited to the embodiment.

Figure 1:
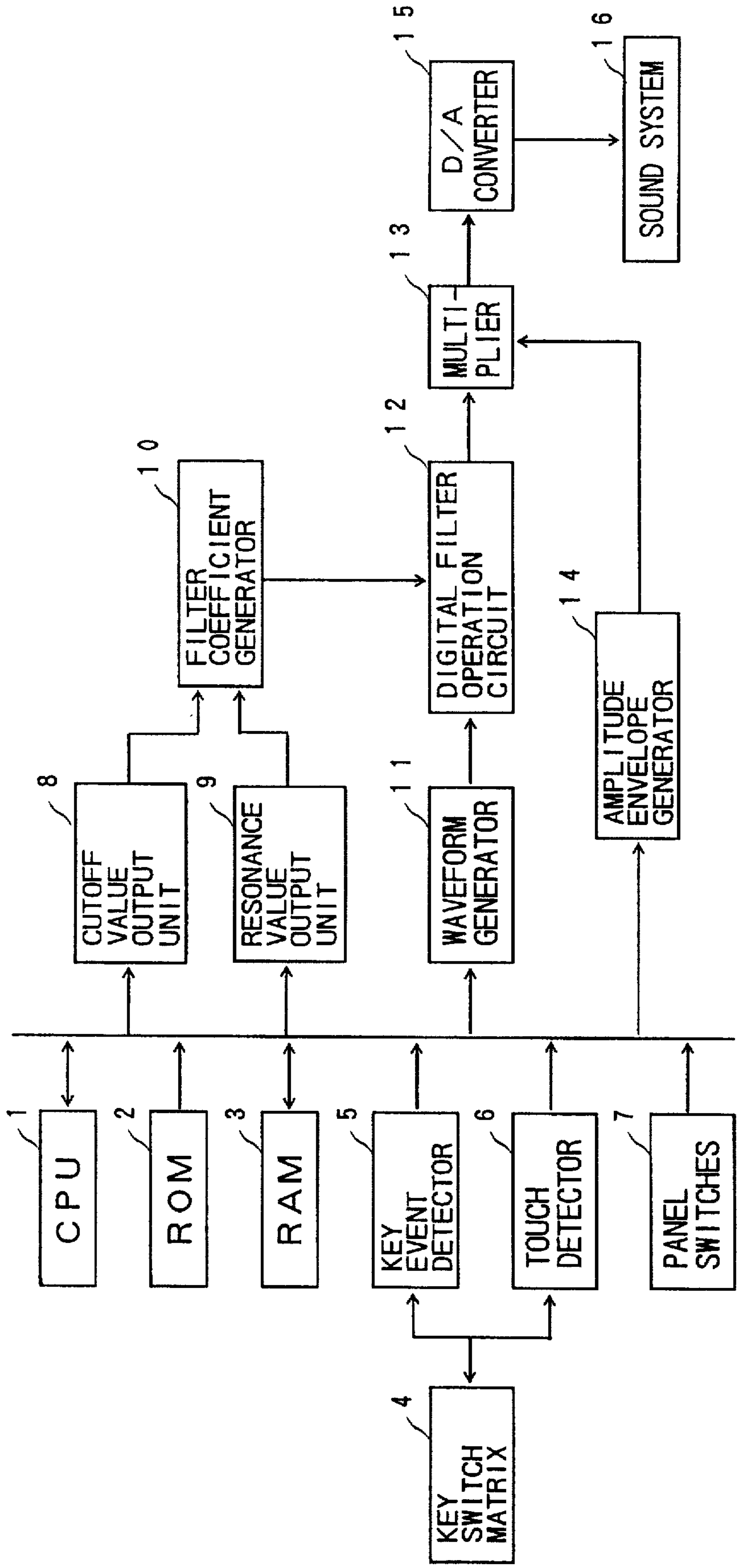
FIG. 1 is a schematic block diagram illustrating the general circuit structure of an electronic musical instrument that has a digital filter device according to the present invention.

FIG. 1 is a diagram illustrating the general structure of an electronic musical instrument that employs a digital filter device of the present invention. A CPU 1, a microprocessor for controlling the entire electronic musical instrument, controls the operation of the electronic musical instrument in consonance with a program that is stored in a ROM 2. The ROM 2 includes a program memory portion in which a program for activating the CPU 1 is stored, and a memory portion in which timbre parameters, a frequency number table, etc., are stored. Various other fixed data are also stored in the ROM 2.

The timbre parameters include a parameter for instructing a waveform generator 11 concerning a waveform that is to be output, a cutoff frequency for a digital filter, a resonance value parameter, and a parameter for controlling an envelope signal that an amplitude envelope generator 14 outputs.

Defined in a RAM 3 are a work area for the CPU 1, and various registers and flags for controlling the electronic musical instrument. Data that concern the states of panel switches 7 are referred to by the CPU 1 at the time of tone production, or at other necessary occasions.

A key switch matrix 4 is an array wherein arranged in a matrix shape are two key switches that are consonant with individual keyboard keys, with the key switches being turned on and off in consonance with key depression/key release. The switches of the key switch matrix 4 form a matrix circuit via a diode, and are scanned by a key event detector 5.

The key event detector 5 scans the switch states and detects key depressions/key releases that are in accord with changes in the states of the key switches. A key depression/key release that is detected by the key event detector 5 is transmitted, together with a key code (key number), to the CPU 1 as key data.

A touch detector 6 is operated synchronously with the key event detector 5 to detect touch data that indicate the strength of key depression or key release. The detected touch data are transmitted to the CPU 1 together with the key data that are detected by the key event detector 5.

The data transfer from the key event detector 5 and the touch detector 6 to the CPU 1 is performed, in some cases, by issuing an interrupt to the CPU 1.

The panel switches 7 include a power switch, a timber select switch, an effect select switch, a volume switch, a rhythm select switch, various other switches for controlling the electronic musical instrument, and a display.

The ON/OFF states of the panel switches 7 are scanned and detected by the CPU 1, and data concerning the detected switch states are stored in the RAM 3 under the control of the CPU 1.

A cutoff value output unit 8 smoothes a cutoff value (resonance frequency) received from the CPU 1, and transmits the resultant value as a target value to the filter coefficient generator 10.

A resonance value output unit 9 smoothes a resonance value (Q) received from the CPU 1 and transmits the resultant value as a target value to the filter coefficient generator 10. The resonance value is a parameter for controlling the resonance characteristic of a filter.

The filter coefficient generator 10 generates a filter coefficient based on a cutoff value that is received form the cutoff value output unit 8 and a resonance value that is received form the resonance value output unit 9. The configuration and operation of the filter coefficient generator 10 will be described in detail later while referring to FIGS. 2 through 4.

The waveform generator 11 generates a tone wave based on a parameter that is provided by the CPU 1. According to a system for generating a tone wave by reading tone wave data that are stored in the memory, the wave generator 11 is constituted by a phase accumulator, a waveform memory, and a sampling interpolation circuit. A tone wave may be generated by an operation, such as FM modulation. A tone wave signal that is generated by the waveform generator 11 is transmitted to a digital filter operation circuit 12.

The digital filter operation circuit 12 employs a filter coefficient, which is received from the filter coefficient generator 10, to perform a filter operation on a tone wave signal that is received by the waveform generator 11. The result of the operation is transmitted to a multiplier 13.

Coefficients A, a, b and f that are supplied to the digital filter operation circuit 12 by the filter coefficient generator 10 are read synchronously with a tone wave signal that is transmitted by the waveform generator 11.

The amplitude envelope generator 14 generates an envelope signal, based on a parameter that is provided by the CPU 1, and transmits it to the multiplier 13. A method for generating an envelope signal is disclosed in, for example, Japanese Unexamined Patent Publication No. Hei 4-101197.

The multiplier 13 multiplies an envelope signal, which is received from the amplitude envelope generator 14, and a tone wave signal, for which a filter operation was performed by the digital filter operation circuit 12, and generates a tone signal to which an envelope signal has been added. The generated tone signal is transmitted to a D/A converter 15.

The D/A converter 15 converts the received digital tone signal into an analog tone signal. The analog tone signal that is obtained by the D/A converter 15 is supplied to a sound system 16.

The sound system 16 converts the received analog tone signal, which is an electric signal, into an acoustic signal. That is, the sound system 16 is an acoustic generation means, such as a loudspeaker, an amplifier or a headphone, from which musical tones are released.

With the thus described arrangement, when a switch of the key switch matrix 4 is turned on by depressing a key on the keyboard, the key depression is detected by the key event detector 5 and is transmitted, accompanied by a key code, to the CPU 1. At the same time, the strength of the key depression is detected by the touch detector 6 and is transmitted to the CPU 1 as touch data.

Based not only on information, such as a timbre and volume, that is designated by the panel switches 7, but also on the key code and touch data, the CPU 1 supplies to the waveform generator 11 a parameter concerning a wave to be generated.

Upon receipt of the parameter, the waveform generator 11 generates tone wave data that are consonant with the selected timbre, and transmits the data to the digital filter operation circuit 12.

In addition, the CPU 1 transmits to the cutoff value output unit 8 and the resonance value output unit 9 parameters that are consonant with a pitch that is designated by the key and a timbre that is designated by the panel switch. Upon receipt of these parameters, the cutoff value output unit 8, and the resonance value output unit 9 respectively smooth the cutoff value and the resonance value, and transmit the resultant values to the filter coefficient generator 10.

The filter coefficient generator 10 generates a filter coefficient based on the received cutoff value and the resonance value, and supplies the filter coefficient to the digital filter operation circuit 12.

The digital filter operation circuit 12 employs the filter coefficient, from the filter coefficient generator 10, to perform a filter operation on the tone wave data that are received from the waveform generator 11, and transmits the result to the multiplier 13.

The filter coefficients that are supplied to the digital filter operation circuit 12 are A, a and b, and f, which is output by a segment approximation circuit 100.

The multiplier 13 multiplies an envelope signal, which is generated by the amplitude envelope generator 14, and a tone signal that is transmitted from the digital filter operation circuit 12, and transmits the result to the D/A converter 15. The D/A converter 15 converts the received signal into an analog signal, which is released by the sound system 16.

Although the processing for a single channel is explained in this embodiment, the processing can be applied for a plurality of channels. For a plurality of channels, an identical hardware set may be provided in a number that is equivalent to the count of the channels, or it may be operated in a time dividing manner.

When a plurality of channels are employed, the filter characteristic that is consonant with the filter coefficient is controlled for each channel.

An explanation will now be given, while referring to FIGS. 2 through 4, for the configuration and operation of the filter coefficient generator 10 of the present invention for which the segment approximation is applied.

Figure 2:
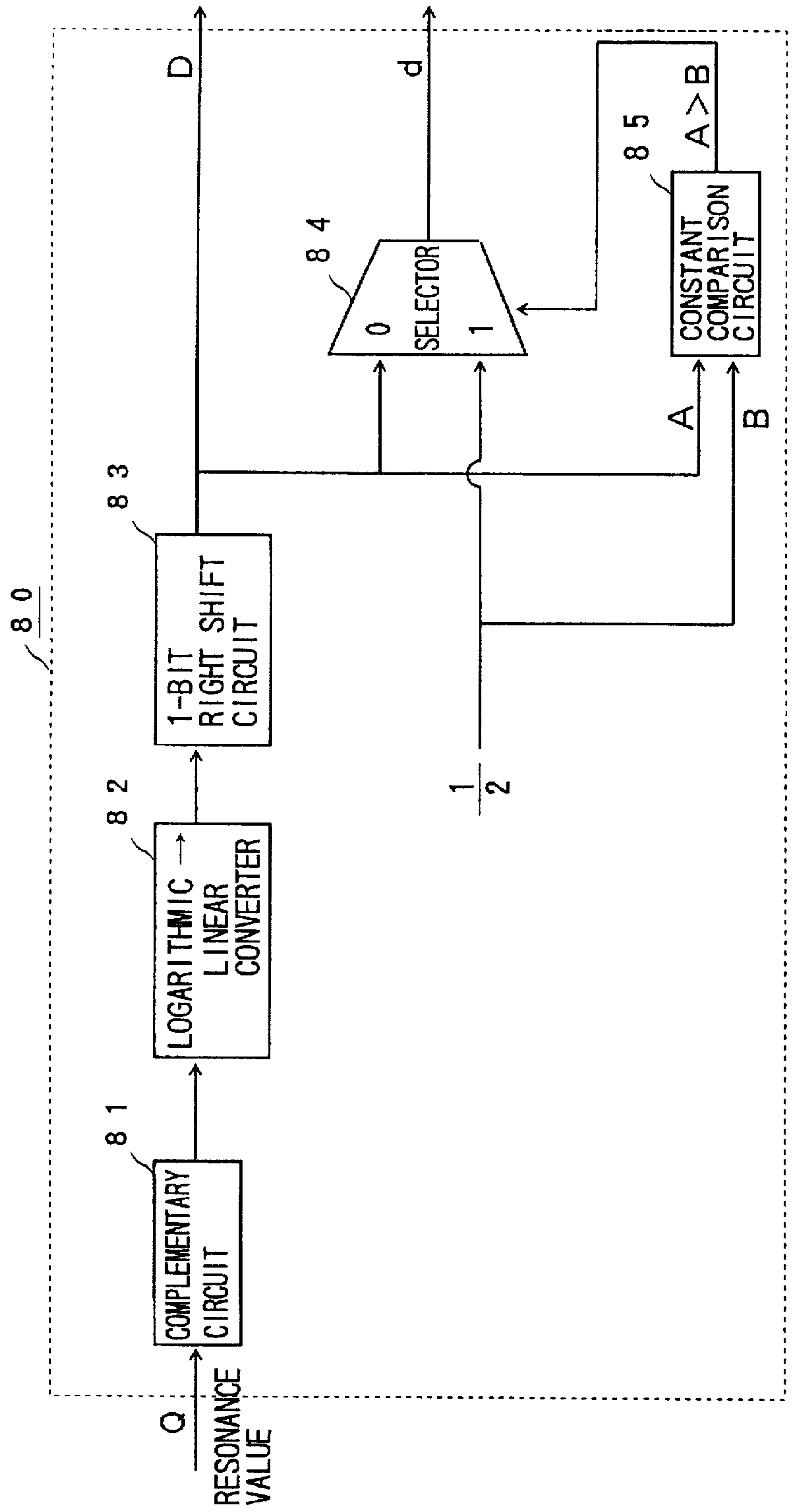
FIG 2 is a diagram for explaining the arrangement of a Q transformation circuit in a filter coefficient generator.

FIG. 2 is a diagram for explaining the arrangement of a Q transformation circuit 80 in the filter coefficient generator 10. The Q transformation circuit 80 transforms the expression form of resonance value Q to generate coefficients D and d. Q is transformed into D and d by the expressions given below.

$$D=1/(2*Q)$$

$$d=1/(2*Q)\ (Q\geqq 1)$$

$$d=1/2\,(Q<1)$$

In the above expressions, the coefficient d is acquired by performing a transformation with Q≧1 and with Q<1 to cope with an overflow.

Therefore, the Q transformation circuit 80 is constituted by a complementary circuit 81, a logarithmic/linear converter 82, a 1-bit right shift circuit 83, a selector 84, and a constant comparator 85, as is shown in FIG. 2.

The complementary circuit 81 outputs a reciprocal of resonance value Q in advance, so as to easily handle 1/(2*Q) by using a multiplier in the following calculation. That is, the complementary circuit 81 calculates a 1/Q value that is used for calculating coefficient D.

The resonance value Q that is transmitted from the resonance value output unit 9 to the complementary circuit 81 is expressed as a logarithmic value (dB). The reciprocal of the resonance value Q is easily obtained via the calculation of the complement by the complementary circuit 81, and is transmitted to the logarithmic/linear converter 82.

The logarithmic/linear converter 82 calculates a linear value (antilog). The reciprocal of the resonance value, for which linear conversion is performed, is multiplied by ½, by the 1-bit right shift circuit 83, to acquire a desired coefficient value D. The coefficient D is transmitted to a multiplier 94.

The generated coefficient D is branched, and is also transmitted to the selector 84 and to one of the terminals of the constant comparator 85. The constant comparator 85 compares the received coefficient D with ½.

The constant comparator 85 is used to determine whether or not Q<1. Since the coefficient D has already been multiplied by ½ by the 1-bit right shift circuit 83, the constant comparator 85 compares the coefficient D with ½ and outputs the result.

The selector 84 receives a control signal, which indicates the result, from the constant comparator 85, and selects and outputs either coefficient D or ½. When, as the result of the process performed by the constant comparator 85, the coefficient D is ½ or less, i.e., when Q≧1, the selector 84 outputs coefficient d, which is the same value as the coefficient D.

When the coefficient D is greater than ½, i.e., when Q<1, the selector 84 outputs ½ as the coefficient d. The coefficient d is transmitted to a multiplier 93.

Figure 3:
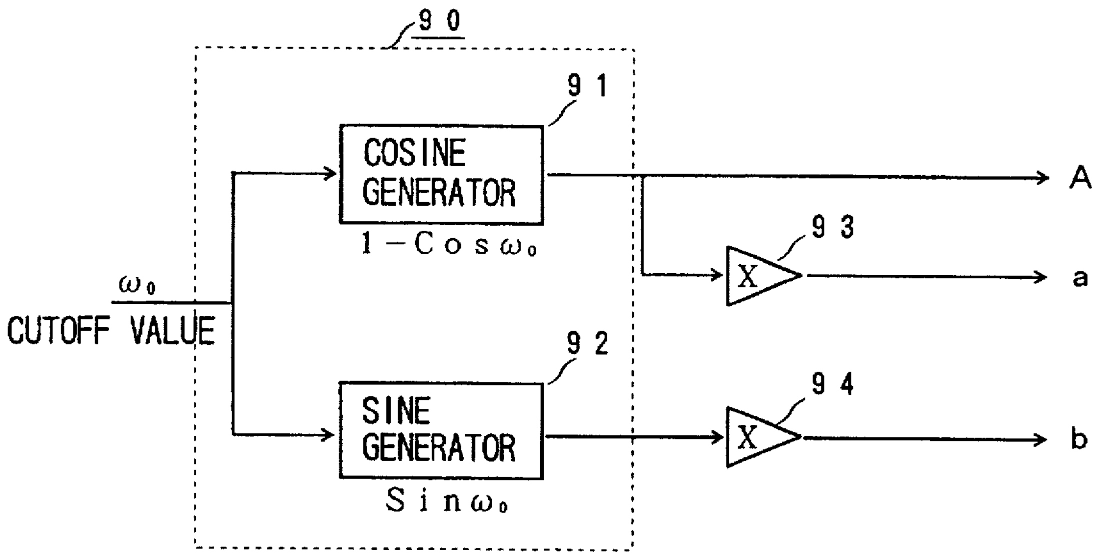
FIG. 3 is a diagram for explaining the arrangement of a trigonometric function generator in the filter coefficient generator.
Figure 4:
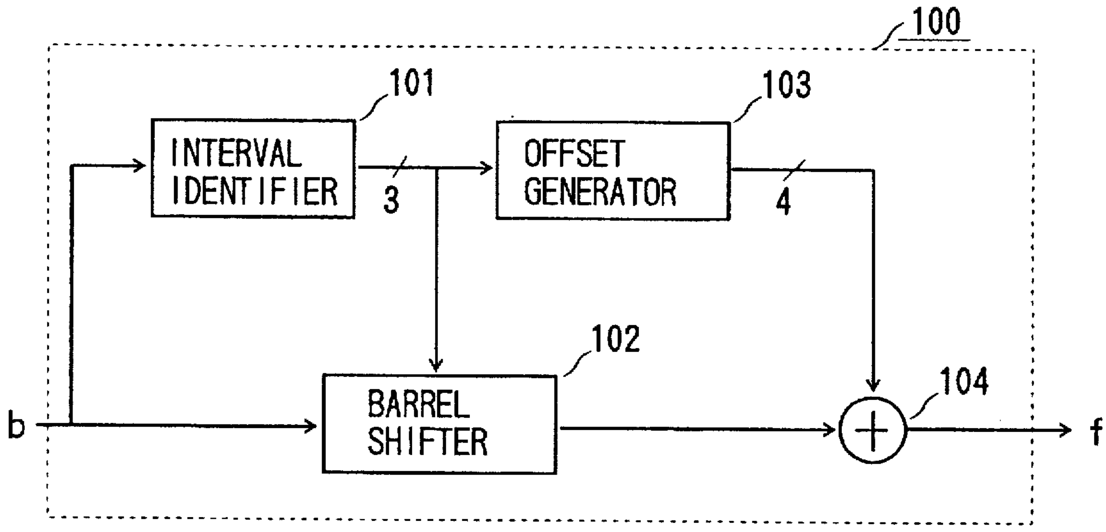
FIG. 4 is a diagram for explaining the arrangement of a segment approximation circuit in the filter coefficient generator.

In FIG. 3 are shown a trigonometric function generator 90 and the multipliers 93 and 94, all of which are constituents of the filter coefficient generator 10.

The trigonometric function generator 90 includes a cosine generator 91 and a sine generator 92, and generates 1−cos $\omega_0$ and sin $\omega_0$ in consonance with cutoff value $\omega_0$, which is received from the cutoff value output unit 8.

Each of the cosine generator 91 and the sine generator 92 has a function table storage portion and a function table interpolation portion (neither of them shown), and data that are consonant with various functions are stored in the function table storage portion of each of the generators 91 and 92.

Predetermined data are read from the function table storage portion by employing, as an address, the cutoff value $\omega_0$, which is received from the cutoff value output unit 8.

Since 1−cos $\omega_0$ is employed for the following calculation, to simplify the operation, 1−cos $\omega_0$ is stored in the function table storage portion in advance, and is output by the cosine generator 91.

With this structure, the cosine generator 91 outputs a new coefficient A, which is branched and transmitted to the multiplier 93. The multiplier 93 multiplies the coefficient A and the coefficient d, which is received from the Q transformation circuit 80, and generates a filter coefficient a.

The sine generator 92 outputs sin$\omega_0$, in consonance with the cutoff value $\omega_0$, and transmits it to the multiplier 94. The multiplier 94 multiplies sin$\omega_0$ and the coefficient D, which is received from the Q transformation circuit 80, and generates filter coefficient b.

When the filter coefficients A, a and b, which are used by a digital filter that accomplishes transfer function expression (1), are obtained, the filter coefficients are supplied to the digital filter operation circuit 12, which then performs a filter operation.

The configuration and operation of the segment approximation circuit 100 will now be described while referring to FIG. 4.

The segment approximation circuit 100 generates filter coefficient f, and provides a number of approximate expressions for f(b)=b/(1+b) by employing b as an input value. In the present invention, the input b is divided into several intervals, and f(b) is linearly approximated in each interval to acquire the filter coefficient f.

The segment approximation circuit 100 is constituted by an interval identification circuit 101, a barrel shifter 102, an offset generator 103, and an adder 104, and the following expressions are employed as approximate expressions for f(b) according to the present invention.

$$\begin{aligned} f(b) &\approx b && (0 \leqq b < 1/4) \\ f(b) &\approx b/2 + 2/16 && (1/4 \leqq b < 1/2) \\ f(b) &\approx b/4 + 4/16 && (1/2 \leqq b < 3/2) \\ f(b) &\approx b/8 + 7/16 && (3/2 \leqq b < 2) \\ f(b) &\approx b/16 + 9/16 && (2 \leqq b < 4). \end{aligned} \tag{3}$$

One of the characteristics of the approximate expressions that are separated by intervals is that the minimum interval unit for b that can be easily expressed by a binary number is ¼. In other words, the upper four bits of b for each interval are expressed by binary numbers as follows:

when 0≦b<¼, 0000
when ¼≦b<½, 0001
when ½≦b<3/2, 001X or 010X
when 3/2≦b<2, 011X
when 2≦b<4, 1XXX where X indicates that a value can be either 0 or 1.

When the value b is divided in this manner, the interval for the value b can be identified only by examining the upper four bits of b.

The interval identification circuit 101 is a kind of encoder that identifies the interval based on the input value b, and outputs the following 3-bit interval data in consonance with the upper four bits of b.

when 0000, 000
when 0001, 001
when 001X or 010X, 010
when 01X, 011
when 1XXX, 100.

The interval data that are output by the interval identification circuit 101 are transmitted to the barrel shifter 102 and the offset generator 103.

As another characteristic of the approximation expressions (3), the denominators of all the variable portions in the expressions are represented by powers of 2, 4, 8 and 16, and the denominators of all the constant terms are 16. A simple configuration can be used for a circuit that processes a binary value.

The barrel shifter 102 shifts the value b to the right the number of times that is equivalent to a bit count, which is designated by the 3-bit interval data that are received from the interval identification circuit 101. The variable portion of the approximation expression for each interval is generated by performing a predetermined number of right shifts based on the interval data.

When, for example, 3-bit interval data 010 (2 in the decimal system) is transmitted to the barrel shifter 102, the barrel shifter 102 shifts the input value b to the right the number of times that is equivalent to two bits, and generates b/4.

The value of the variable portion in the approximation expression is generated in this manner, so that when 000, b,
when 001, b/2,
when 010, b/4,
when 011, b/8, and
when 100, b/16.

The obtained value is transmitted to the adder 104.

The offset generator 103 is a kind of decoder that generates a constant term based on the interval data that are received from the interval identification circuit 101, and generates an offset value that is represented by four bits.

In other words, the offset generator 103 generates, when 000, 0000 (0);

when 001, 0010 (2/16);

when 010, 0100 (4/16);

when 011, 0111 (7/16); and when 100, 1001 (9/16).

The adder 104 adds the value of the variable portion, which is received from the barrel shifter 102, and the value of the constant term, which is received from the offset generator 103, to generate a desired filter coefficient f, and transmits the resultant sum to a multiplier 22 (see FIG. 5) of the digital filter operation circuit 12.

According to the present invention, the segment approximation circuit 100 having a simple structure can acquire, relative to input value b, an approximate value for f(b) for each of the intervals that are represented by the expressions (3).

Figure 5:
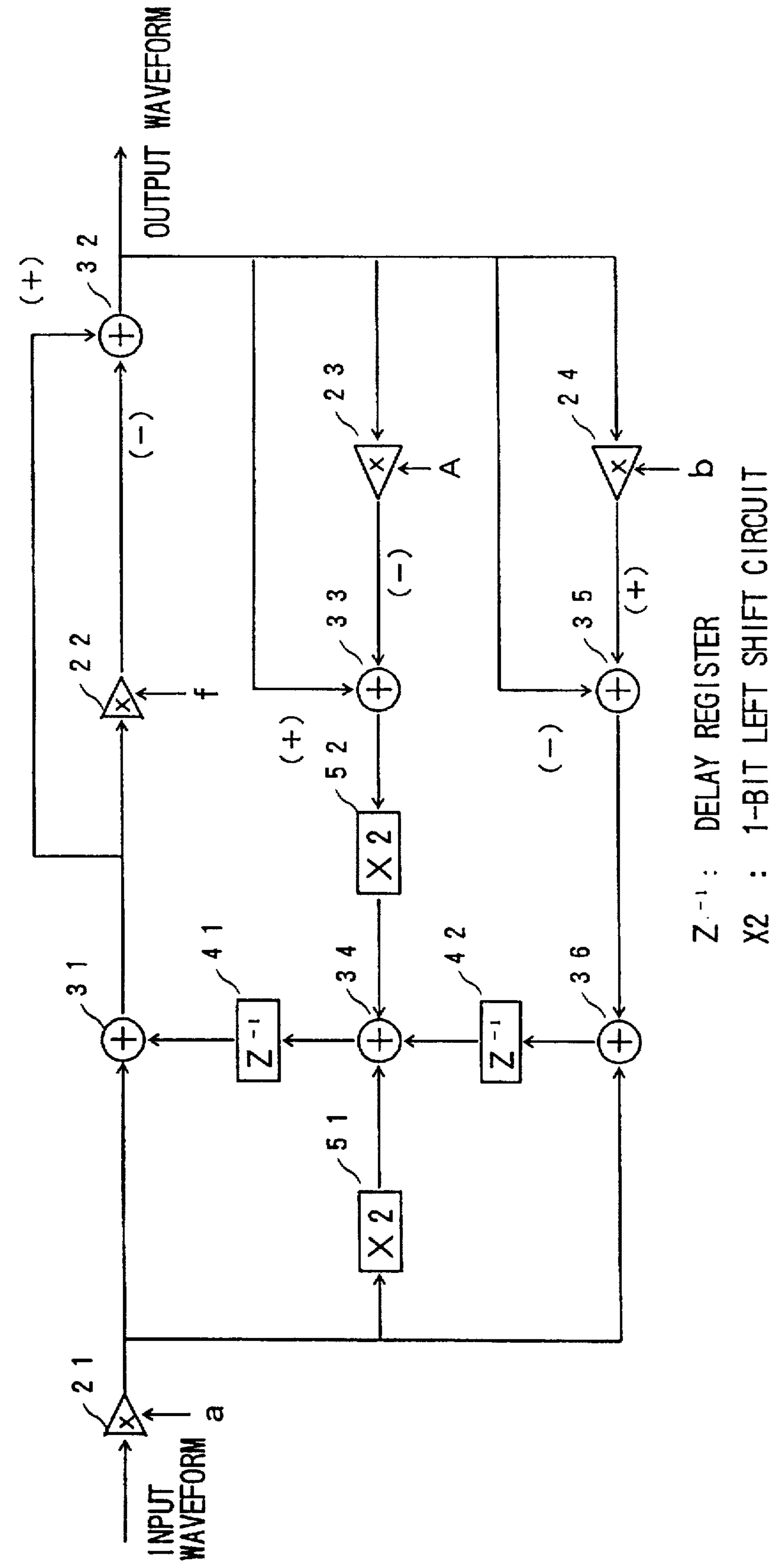
Fig. 5 is a diagram for explaining the arrangement of a digital filter operation circuit according to the present invention.

FIG. 5 is a diagram illustrating an example of the digital filter operation circuit 12 that performs a filter operation by using a filter coefficient that is output by the filter coefficient generator 10 of the present invention.

In FIG. 5, the digital filter operation circuit 12 includes multipliers 21 through 24, adders 31 through 36, delay registers 41 and 42, and 1-bit left shift circuits 51 and 52. Filter coefficients A, a, b and f are to be supplied to the digital filter operation circuit 12. It should be noted that the digital filter operation circuit 12 serves as a transposed, second order IIR filter.

With this arrangement, the multiplier 22 and the adder 32 perform a multiplication using 1/(1+b) to acquire an approximate value. In this embodiment, the multiplier 22 multiplies the obtained approximate value for f(b) and the output of the adder 31. The adder 32 adds the output of the multiplier 22 to the output of the adder 31. In this manner, multiplication by 1−f(b), i.e., 1/(1+b), is accomplished.

Although in this embodiment a range of $0 \leqq b < 4$, i.e., $Q > 1/8$, has been employed, the present invention is not thus limited. So long as the interval is divided and displayed in order to facilitate processing by binary numbers, any range may be employed. The same principle can be applied for the forms that represent the variable portion and the constant term of the approximation expression.

As is described above in detail, according to the present invention, although a simple circuit structure is employed, a filter coefficient f can be calculated with only a small approximation error. Further, while conventionally the calculation of an approximate filter coefficient is applied only within a range of $Q \geqq 1$, in the present invention, the application range for value Q can be extended to $Q > 1/8$. As a result, an electronic musical instrument that can produce musical tones having a variety of timbres can be provided at a low price.

Various modes of carrying out the invention are contemplated as being within the scope of the following claims, which in particular point out and distinctly claim the subject matter regarded as the invention.

What is claimed is:

1. A digital filter device, for an electronic musical instrument, comprising:

filter coefficient generation means for generating a set of filter coefficients in consonance with a designated resonance frequency and Q; and filter operation means for performing an operation for an IIR digital filter, relative to an input tone wave, by using said filter coefficient, which is generated by said filter coefficient generation means, with said filter coefficient generation means including trigonometric function output means, for outputting a trigonometric function value that is consonant with said resonance frequency, and filter coefficient calculation means, for calculating a plurality of filter coefficients based on said Q and said trigonometric function value that is generated by said trigonometric function output means, and with said filter coefficient calculation means having segment approximation means for performing, within a range of $x \geqq 0$, segment approximation of a function $f(x)=x/(1+x)$, or $f(x)=1/(1+x)$, and for outputting said filter coefficients.

2. A digital filter device for an electronic musical instrument according to claim 1, wherein an upper limit value for said segment approximation, which is performed by said segment approximation means, is so set as a value in said range of $x \geqq 0$ that said upper limit value can be easily identified by using a binary number.

3. A digital filter device for an electronic musical instrument according to claim 2, wherein said upper limit value of a range for said segment approximation, which is performed by said segment approximation means, is four.

4. A digital filter device for an electronic musical instrument according to claim 2, wherein a division point of said range for said segment approximation, which is performed by said segment approximation means, is set so that said division point can be easily identified by using a binary number.

5. A digital filter device for an electronic musical instrument according to claim 1, wherein an upper limit value of a range for said segment approximation, which is performed by said segment approximation means, is four.

6. A digital filter device for an electronic musical instrument according to claim 5, wherein a division point of said range for said segment approximation, which is performed by said segment approximation means, is set so that said division point can be easily identified by using a binary number.

7. A digital filter device for an electronic musical instrument according to claim 1, wherein a division point of said range for said segment approximation, which is performed by said segment approximation means, is set so that said division point can be easily identified by using a binary number.

8. A digital filter device for an electronic musical instrument according to claim 1, wherein an approximation expression that is set for said segment approximation, which is performed by said segment approximation means, is set so that a variable and a constant term of said approximation expression can be easily calculated by using a binary number.

9. A digital filter device for an electronic musical instrument according to one of claim 1, wherein said filter coefficient generation means has Q transformation means, for transforming a form that represents said Q, and wherein output of said Q transformation means is used by said filter coefficient calculation means.

* * * * *